March 5, 1968
G. E. SOPER
3,371,552
ROLLING CONTACT GEAR
Filed Aug. 30, 1965
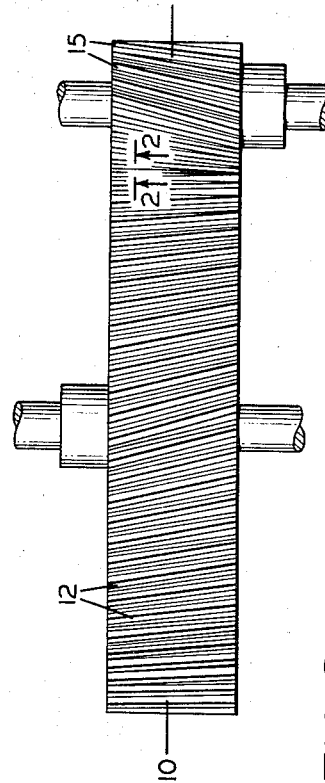
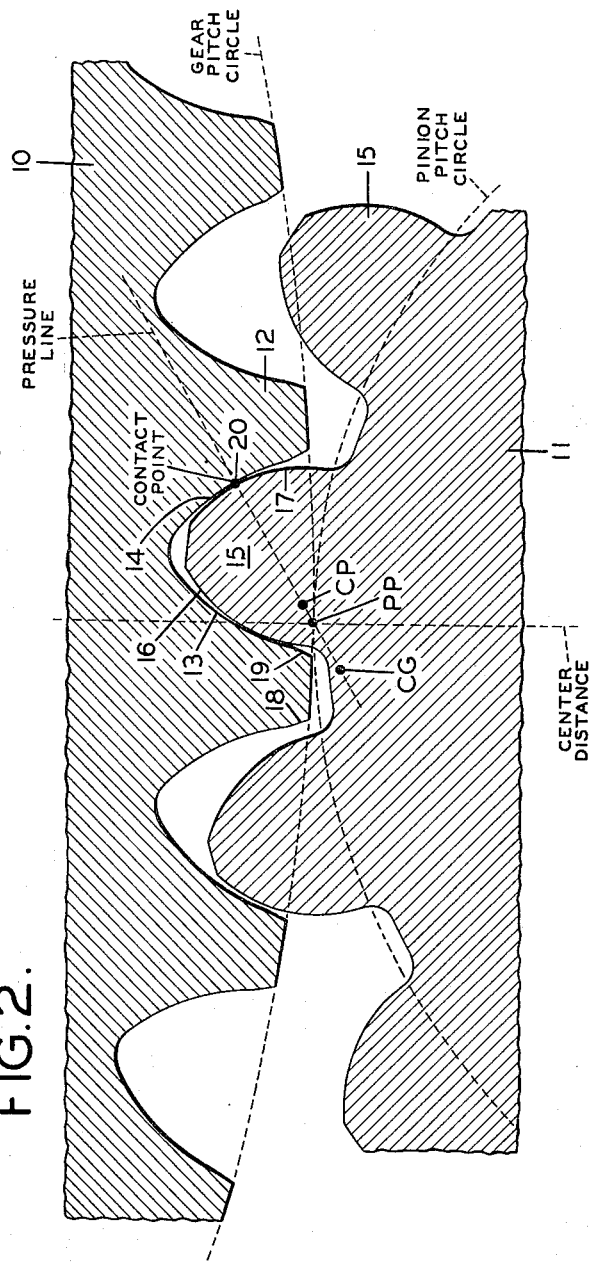
INVENTOR
GUY E. SOPER
BY
HIS ATTORNEYS

United States Patent Office 3,371,552
Patented Mar. 5, 1968

3,371,552
ROLLING CONTACT GEAR
Guy E. Soper, Williamsport, Md., assignor to Mack Trucks, Inc., Montvale, N.J., a corporation of New York
Filed Aug. 30, 1965, Ser. No. 483,547
4 Claims. (Cl. 74—462)

ABSTRACT OF THE DISCLOSURE

Rolling contact helical gears are provided which are insensitive to normal manufacturing errors and to changes in the center distances between the gears arising from variation of the load on the gears and are characterized by gear teeth having tooth profiles formed as circular arcs, the centers of which are located on the line passing through the pitch point and contact point of the gear teeth and in which the spacing of the centers of the tooth profile arcs from the pitch point are in proportion to the number of teeth on the gears.

---

This invention relates to helical gears having parallel axes of rotation and, more particularly, to nonconjugate rolling contact helical gears.

Conjugate gears and the law of conjugate action are well known. For example, the U.S. patent to Trbojevich 1,973,185 dated Sept. 11, 1934 discloses conjugate helical gears having parallel axes of rotation in which one of the gears, e.g., the gear having the greater number of teeth, has teeth with concave profiles and the other gear has teeth with convex profiles, these profiles being related so that the pressure line, i.e., the line from the contact point that is normal to the tangent line at the contact point passes through the pitch point for all points of contact. In such conjugate gears, the teeth are shaped to operate and mesh with an action which transmits uniform rotary motion from the driving gear to the driven gear. In such gears the tooth contact point moves up one profile and down the mating profile along the path known as the profile line of action.

Rolling contact gears operate on a different principle. The tooth profiles of such rolling contact gears are designed so that there is no conjugate action to cause the toothed contact point to move up one profile and down the mating profile. The tooth contact point for rolling contact gears stays at a fixed distance from the axes of rotation of the gear throughout the entire tooth engagement so that uniform rotary motion is transmitted from the driving gear to the driven gear by the travel of the tooth contact point in a direction lengthwise of the gear teeth. In order to provide uniform rotary motion, the teeth must be helical to provide a lead action with a helix overlap. Usually such rolling contact gears have concave tooth profiles on the gear having the larger number of teeth and convex tooth profiles on the gear having the smaller number of teeth, the tooth profiles being circular arcs of different radii shaped by the generating action of hob tools having curved cutting edges.

As long as tooth profiles are cut accurately and the center distance between the gears does not vary, such rolling contact gears operate quietly and smoothly and with a minimum of wear. On the other hand, when the center distance changes, as for example, because of loading of the gears tending to force them apart, mating teeth will be pulled slightly out of mesh causing the contact point of the gear to shift and the pressure line perpendicular to the tangent to the gear teeth at the contact point no longer passes through the pitch point of the gears. As a consequence, such gears will operate noisily and wear rapidly.

In accordance with the present invention, I have provided gears of the rolling contact helical type which are insensitive to normal changes in the center distance spacing or normal manufacturing errors so that rotary motion is transmitted smoothly from one gear to the other without gear noise and without unnecessary wear on the gear teeth. More particularly, the teeth on the gears are formed with tooth profiles formed as circular arcs, the centers of which are located on the line passing through the pitch point and contact point of the gear teeth and in which the spacing of the centers of the profile arcs from the pitch point are in proportion to the number of teeth on the respective gears. With this arrangement, an increase or decrease in the center distance between the gears shifts the pitch point, the contact point and the centers of curvatures of the profiles of the gear teeth in the same relation so that the pressure line passes through the profile curve centers and the pitch point of the gear teeth.

More particularly, if for example, the center distance increases under heavy applied loads, each respective gear center will be moved away from the pitch point causing an enlargement of each respective pitch circle. The mating teeth will be pulled somewhat out of mesh by such action causing the contact point to shift toward the top of the concave tooth profile and toward the root of the convex profile. This same movement of the teeth mesh will also move the tooth profile centers of curvature in a direction substantially parallel to the center distance line of the gear. This movement of the tooth profile center points for each of the mating gear members is directly proportional to the increase in each respective pitch radius. The resultant of the combined movements is to cause the pressure line to pass through the pitch point for all increases in the gear center distance due to applied loads.

The above principle is true for the following reasons. The pressure line must not only contain the contact point but also must contain the two centers of curvatures of the mating teeth profile. When these profile centers of curvature are restricted to a movement around the pitch point that is directly proportional to the size change of each respective pitch circle (the circular arc of such pitch circles must contain the pitch point) then the pressure line containing the profile center points will also contain the pitch point.

Another visualization of this principle is to imagine the pitch point as being fixed in position and the two respective profile center points being moved in a direction to increase or decrease the center distance. This movement will result in a movement of the two respective profile center points around the fixed pitch point as the pressure line is rotated about the pitch point and moving the contact point along the tooth profiles because of this rotation. In view of the tooth and profile relation established by properly locating the profile center points the gears will operate smoothly in mesh with resulting improvement in the operation and longevity of the gears despite load deflection and manufacturing errors.

For a better understanding of the present invention, reference may be had to the accompanying drawing in which:

FIGURE 1 is a plan view of a pair of rolling contact helical gears embodying the present invention; and FIGURE 2 is a cross sectional view of a portion of the gears on an enlarged scale illustrating the relations between the gear teeth.

For purposes of illustration, a pair of helical gears is disclosed, one gear 10 having 59 teeth and the other pinion gear 11 having 15 teeth. The teeth 12 on the gear 10 are cut with a convex cutter and have circular arc concave profiles 13 and 14. The teeth 15 of the pinion 11 are cut with a cutter having a concave edge and are formed with circular arc convex profiles 16 and 17. The outer ends of the gear teeth 12 are relieved by the tapered surfaces 18 and 19 for clearance. In the gears illustrated, the outside diameter of the gear 10 is 12.7568 inches which corresponds also to the gear pitch circle. The outside diameter of the 15 tooth pinion is 3.8734 inches. The pitch diameter of the pinion is 3.2432 inches.

The circular pitch of the teeth of the pinion 11 is .6793 inch while the height of the teeth 15 is .3669 inch.

In the gear 10, the height of the teeth is .3413 inch.

In the gear and pinion illustrated, the radius of the surface 14 and the radius of curvature of the surface 13 is .5971 inch while the radius of curvature of the profiles of the gear teeth 15 is .3412 inch.

The centers of the radii of curvature are located on the pressure line which passes through the contact point 20 of the gear and pinion and the pitch point PP at the intersection of the gear pitch circle and the center distance line. The center CP of the radius of curvature of the profile 17 is spaced .0519 inch from the pitch point PP. The center CG of the profile 14 of the gear tooth is spaced .2040 inch from the pitch point PP and on the opposite side of it from the center CP. In gear 10 and pinion 11, the helix angle of the gear teeth is 17° 30 minutes right and left hand for the pinion and gear, respectively, to provide proper lead and helix overlap.

The spacing of the pinion and profile centers CP and CG from the pitch point PP is in proportion to the number of teeth on the pinion and gear, that is:

$$\frac{.0519}{.2040} = \frac{15}{59}$$

With this relationship, an increase in the center distance between the gears may move the contact point 20, for example, toward the outer ends of the teeth 12 and toward the roots of the teeth 15 so that the pressure line running through the contact point and the pitch point will be moved in a clockwise direction. However, inasmuch as the pinion profile center CP and gear profile center CG will move a proportional distance and the diameters of the pitch circles of the gear and pinion increase, centers CP and CG will remain on the shifted pressure line and it will pass through the pitch point. Consequently, proper line contact along the length of the teeth and the law of conjugate action are preserved and such shifting accordingly, does not in any way effect the operation of the gears with regard to increased noise, wear or non-uniform transmission of rotary motion from one gear to the other.

It will be understood that the same principles are applicable to gears of different size and having different numbers of teeth and different radii of curvature of the tooth profiles. Accordingly, the invention disclosed herein is limited only as defined in the following claims.

I claim:

1. Rolling contact gears comprising a pair of mating gears rotatable on parallel axes, said gears having helical teeth with non-conjugate circular arc profiles in planes normal to said axes, the centers of the arcs of said profiles lying on a line extending through the contact point of said teeth and the pitch point of said gears and being located on opposite sides of said pitch point and spaced from said pitch point distances directly proportional to the number of teeth on said gears.

2. The rolling contact gears set forth in claim 1 in which the gears have different numbers of teeth, the teeth on the gear having the larger number of teeth having concave profiles and the teeth on the other gear having convex profiles.

3. Rolling contact gears comprising a pair of mating gears rotatable on parallel axes, said gears having helical teeth with non-conjugate arc shaped profiles normal to said axes, the said arc shaped profiles resulting from circular arcs in a plane normal to the helix of said teeth, the centers of said arc shaped profiles lying on a line extending through the contact point of said teeth and the pitch point of said gears and being located on opposite sides of said pitch point and spaced from said pitch point distances directly proportional to the number of teeth on said gears.

4. The rolling contact gears set forth in claim 3 in which the gears have different numbers of teeth, the teeth of the gear having the larger number of teeth having concave profiles and the teeth on the other gear having convex profiles.

References Cited

UNITED STATES PATENTS

| 3,180,172 | 4/1965 | Leggatt | 74—462 |
| 3,192,786 | 7/1965 | Stott | 74—462 |
| 3,251,236 | 5/1966 | Wildhaber | 74—462 |
| 3,269,205 | 8/1966 | Niemann | 74—462 |

FRED C. MATTERN, Jr., *Primary Examiner*

DAVID J. WILLIAMOWSKY, *Examiner.*

C. J. HUSAR, *Assistant Examiner.*